(12) United States Patent
Ramaswamy et al.

(10) Patent No.: US 9,685,665 B2
(45) Date of Patent: Jun. 20, 2017

(54) SYSTEM AND METHOD FOR THERMAL PRIORITY OPERATION OF A FUEL CELL POWER PLANT

(75) Inventors: Sitaram Ramaswamy, West Hartford, CT (US); Paul R. Margiott, South Windsor, CT (US); Paul R. Hanrahan, Farmington, CT (US); Mithun Kamat, Manchester, CT (US)

(73) Assignee: DOOSAN FUEL CELL AMERICA, INC., Atlanta, GA (US)

( * ) Notice: Subject to any disclaimer, the term of this patent is extended or adjusted under 35 U.S.C. 154(b) by 1159 days.

(21) Appl. No.: 14/125,345

(22) PCT Filed: Aug. 16, 2010

(86) PCT No.: PCT/US2010/045608
§ 371 (c)(1),
(2), (4) Date: Jul. 28, 2014

(87) PCT Pub. No.: WO2012/023925
PCT Pub. Date: Feb. 23, 2012

(65) Prior Publication Data
US 2014/0329160 A1 Nov. 6, 2014

(51) Int. Cl.
*H01M 8/04* (2016.01)
*H01M 8/04029* (2016.01)
(Continued)

(52) U.S. Cl.
CPC ... *H01M 8/04029* (2013.01); *H01M 8/04059* (2013.01); *H01M 8/04358* (2013.01);
(Continued)

(58) Field of Classification Search
CPC ..................................................... H01M 8/04
See application file for complete search history.

(56) References Cited

U.S. PATENT DOCUMENTS 6,498,121 B1 * 12/2002 Gorer ...................... B01J 23/40
429/218.1

FOREIGN PATENT DOCUMENTS

| JP | 2005038676 A | 2/2005 |
| JP | 2006038325 A | 2/2006 |

(Continued)

OTHER PUBLICATIONS

JP 2005-038676 MT.*

(Continued)

*Primary Examiner* — Patrick Ryan
*Assistant Examiner* — Alex Usyatinsky
(74) *Attorney, Agent, or Firm* — Carlson, Gaskey & Olds

(57) ABSTRACT

A thermal priority fuel cell power plant includes a cell stack assembly for generating an electrical power output. The cell stack assembly includes an anode, a cathode, and a waste heat recovery loop. The waste heat recovery loop is configured to remove waste heat generated from the electrochemical reaction and is thermally coupled to the cell stack assembly for managing the waste heat of the cell stack assembly and for supplying thermal power to a thermal load demand. The waste heat recovery loop includes a heat exchanger in heat exchange relationship with the coolant outlet conduit and the thermal load demand. A controller is operatively associated with the cell stack assembly and the waste heat recovery loop. The controller controls the operation of the cell stack assembly by adjusting a fuel cell power plant parameter responsive to the thermal load demand.

19 Claims, 4 Drawing Sheets

(51) Int. Cl.
    *H01M 8/04007*     (2016.01)
    *H01M 8/0432*     (2016.01)
    *H01M 8/04701*     (2016.01)
    *H01M 8/086*     (2016.01)

(52) U.S. Cl.
    CPC ....... *H01M 8/04723* (2013.01); *H01M 8/086* (2013.01); *H01M 2250/10* (2013.01); *Y02B 90/14* (2013.01)

(56) References Cited

FOREIGN PATENT DOCUMENTS

| | | |
|---|---|---|
| JP | 2008215782 A | 9/2008 |
| WO | 2007114802 A1 | 10/2007 |
| WO | 2009058112 A1 | 5/2009 |

OTHER PUBLICATIONS

JP2008215782 MT.*
JP 2005038676—Abstract.*
International Search Report for International application No. PCT/US2010/045608 dated May 30, 2011.
Written Opinion of the International Searching Authority for International application No. PCT/US2010/045608 dated May 30, 2011.
International Preliminary Report on Patentability for International application No. PCT/US2010/045608 dated Feb. 28, 2013.

* cited by examiner

SYSTEM AND METHOD FOR THERMAL PRIORITY OPERATION OF A FUEL CELL POWER PLANT

FIELD OF THE DISCLOSURE

The present disclosure relates generally to fuel cell power plants and, more particularly, to a method and apparatus for prioritizing the thermal output of a fuel cell power plant.

BACKGROUND

A fuel cell is an electrochemical cell which consumes fuel and an oxidant on a continuous basis to generate electrical energy. The fuel is consumed at an anode and the oxidant at a cathode. The anode and cathode are placed in electrochemical communication by an electrolyte. One typical fuel cell employs a phosphoric acid electrolyte. The phosphoric acid fuel cell uses air to provide oxygen as an oxidant to the cathode and uses a hydrogen rich stream to provide hydrogen as a fuel to the anode. After passing through the cell, the depleted air and fuel streams are vented from the system on a continuous basis.

A typical fuel cell power plant comprises one or more stacks of fuel cells, the cells within each stack being connected electrically in series to raise the voltage potential of the stack. A stack may be connected in parallel with other stacks to increase the current generating capability of the power plant. Depending upon the size of the power plant, a stack of fuel cells may comprise a half dozen cells or less, or as many as several hundred cells. Air and fuel are usually fed to the cells by one or more manifolds per stack.

In each of the fuel cells, waste heat is a by-product of the steam reforming process for conversion of natural gas to a hydrogen rich steam, electrochemical reactions, and the heat generation associated with current transport within the cell components. Accordingly, a cooling system must be provided for removing the waste heat from a stack of fuel cells so as to maintain the temperature of the cells at a uniform level which is consistent with the properties of the material used in the cells and the operating characteristics of the cells.

In the stack, where the chemical reactions take place, water is used to cool the stack and generate steam to be used in the fuel processing system, where chemical reactions occur to generate hydrogen. The waste heat, which is at around 350° F. and includes water, exit air and depleted fuel, is directed to a waste heat recovery loop to provide the customer with low grade heat (i.e. up to 140° F.). The heat recovery loop often includes a condenser coupled with a glycol loop and a heat exchanger that couples the water system with the glycol loop. The customer can also get high grade heat (i.e. up to 335° F.) via the water which receives heat from the stack cooling loop. The temperatures for high grade heat and low grade heat will vary depending upon the fuel cell system (e.g., solid oxide or molten carbonate). The high temperature allows the fuel cell power plant to be utilized in a cogeneration power system.

A fuel cell cogeneration power system, or fuel cell combined heat and power (CHP) system, generates electrical and thermal energy in a single, integrated system. Typical components of a fuel cell CHP system include a fuel cell power plant as the electrical generator, an electrical interconnection coupled to the fuel cell power plant, and a heat recovery system coupled to the waste heat generated by the fuel cell power plant. The heat recovery system is used to meet the direct thermal demands of a facility or process, such as steam or hot water. Alternately, the waste heat may be used as a heat source for an absorption/chiller system to meet indirect facility thermal load demands, such as chilled water for facility cooling and heating.

Typical fuel cell power plants operate either in a grid-connect mode or grid-independent mode. In grid-connect mode, the operator or site controller provides a constant electrical power set point for the fuel cell power plant. Any facility electrical demand in excess of the set point is supplied by the grid. In grid-independent mode, the fuel cell power plant is the sole provider of electrical power for the site, and the electrical output of the fuel cell power plant varies according to the electrical demand of the site.

One drawback to both types of systems is that the fuel cell power plant is configured to generate electrical power as a first priority, and the thermal power output—whatever it may be—is delivered to the heat recovery system as a secondary consideration. In either mode, the waste heat generated by the fuel cell power plant is an uncontrolled parameter and will vary based upon system variables such as power level, operating time, and electrical efficiency, to name a few. This operating limitation may frustrate site operators who place a premium on satisfying thermal demands, such as when the cost of such thermal demands is proportionately more expensive than satisfying the electrical demands.

SUMMARY OF THE INVENTION

In one aspect of the disclosure, a thermal priority fuel cell power plant includes a cell stack assembly for generating an electrical power output. The cell stack assembly includes an anode, a cathode, and a waste heat recovery loop. The anode is configured to receive a fuel, the cathode is configured to receive an oxidizer, and the cell stack assembly is configured to generate the electrical power output by electrochemically reacting the anode fuel and the cathode oxidizer in the presence of a catalyst. The waste heat recovery loop includes a coolant inlet conduit and a coolant outlet conduit, and is configured to remove waste heat generated from the electrochemical reaction.

A waste heat recovery loop is thermally coupled to the cell stack assembly for managing the waste heat of the cell stack assembly and for supplying thermal power to a thermal load demand. The waste heat recovery loop includes a heat exchanger in heat exchange relationship with the coolant outlet conduit and the thermal load demand.

A controller is operatively associated with the cell stack assembly and the waste heat recovery loop. The controller controls the operation of the cell stack assembly by adjusting a fuel cell power plant parameter responsive to the thermal load demand.

In one example, the fuel cell power plant parameter is reactant utilization.

In another example, the fuel cell power plant parameter is a temperature for a thermal management system accumulator.

In another aspect of the disclosure, a method for operating a fuel cell power plant in thermal priority mode is provided. The method includes the steps of providing a cell stack assembly configured to generate an electrical power output by electrochemically reacting an anode fuel and a cathode oxidizer in the presence of a catalyst. The cell stack assembly further includes a waste heat recovery loop configured to remove waste heat generated from the electrochemical reaction. The method further includes the step of providing a waste heat recovery loop thermally coupled to the cell stack assembly for managing the waste heat of the cell stack assembly and for supplying thermal power to a facility thermal load demand. The method further includes the step of controlling the operation of the cell stack assembly by adjusting a fuel cell power plant parameter responsive to the facility thermal load demand.

BRIEF DESCRIPTION OF THE DRAWINGS

For a further understanding of the invention, reference will be made to the following detailed description of the invention which is to be read in connection with the accompanying drawing, wherein.

DETAILED DESCRIPTION

Figure 1:
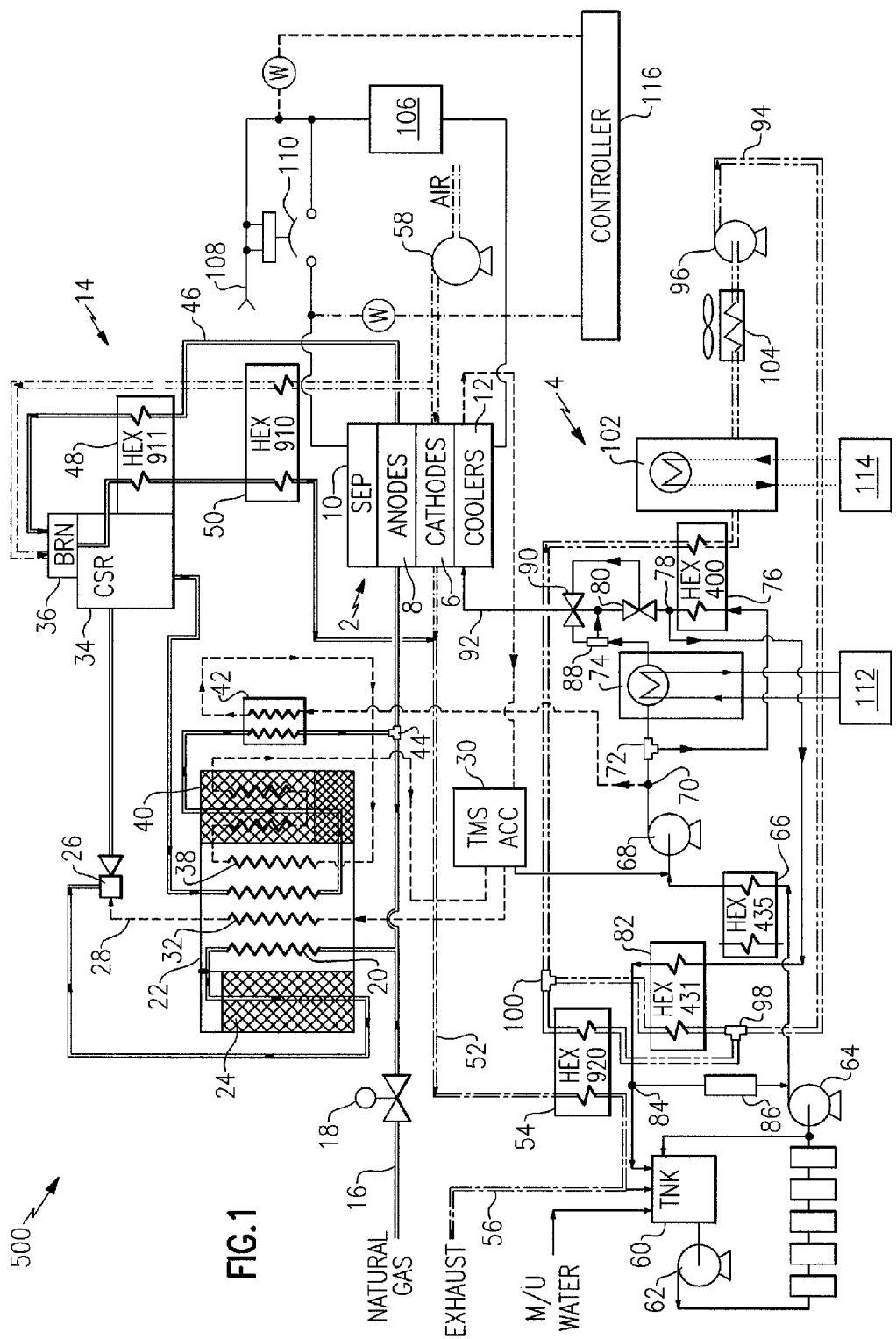
FIG. 1 is a schematic illustration of a fuel cell power plant system in accordance with an embodiment of the present disclosure.

Referring to FIG. 1, in one embodiment a phosphoric acid fuel cell power plant 500 includes a cell stack assembly 2 and a waste heat recovery loop 4. The cell stack assembly 2 includes a plurality of cells electrically connected in series. Each cell includes a silicon carbide matrix which is soaked with phosphoric acid electrolyte. The matrix is sandwiched between a cathode 6 or oxidant electrode and an anode 8 or fuel electrode. Gas impervious plates, e.g., separators 10, separate adjacent cells in the cell stack assembly 2 and, in some arrangements, may include electrolyte reserve plates. A cooler plate 12 is interposed periodically in the plurality of cells to remove the heat generated by the electrochemical reaction.

In the illustrated example, the cell stack assembly 2 is a phosphoric acid stack assembly, but other fuel cell technologies are conceivable within the scope of the disclosure. For example, the cell stack assembly 2 may be a solid oxide fuel cell, which generates significant thermal energy as a byproduct of the electrochemical reaction, a molten carbonate fuel cell, or a proton exchange membrane (PEM) fuel cell. The PEM generates less thermal energy, but may still have application within the context of the disclosure.

Within the anodes 8, a supply of hydrogen is provided to fuel the chemical reactions within the anodes in a manner to be described hereinafter. Similarly, within the cathodes 6, a supply of ambient air is provided as an oxidant for fueling the chemical reaction within the cathode in a manner to be described hereinafter. Finally, the cooler plates 12 are fluidly connected to the waste heat recovery loop 4 to remove heat from the fuel cell stack assembly 2 in a manner to be described hereinafter.

The fuel cell power plant 500 may further include a fuel processing system 14, the flow sequence being further described with reference to the flow loop characterized by double solid lines. A supply of natural gas is provided along line 16 through natural gas valve 18 to a HEX300 heat exchanger 20 arranged within a fuel processing system integrated low temperature shift converter assembly 22, or FPS ILS. The HEX300 heat exchanger 20 raises the temperature of the natural gas from 70° C. to 303° C. The heated gas then flows to a hydro-desulphurizer 24, or HDS, where sulfur is removed from the natural gas. The gas then flows to an ejector 26 where it is mixed with steam from an ejector steam line 28. The ejector steam line 28 originates at a thermal management system (TMS) accumulator 30, picks up heat through a HEX351 heat exchanger 32 within the FPS ILS 22, and delivers the steam to the ejector 26. The mixture then flows through a cell stack reformer 34 where the $CH_4$ (methane) and $H_2O$ is reformed into $CO_2$ and $H_2$ and trace amounts of CO. The cell stack reformer 34 is heated by a burner 36 to cause an endothermic reaction to complete the reforming process. The reformate then flows through the FPS ILS 22 serving as the hot side to heat exchangers HEX300 20, HEX351 32, and a HEX340 38. The reformate gives up some heat and then enters the low temperature shift converter 40 where the CO is converted to $H_2$ and $CO_2$.

From the low temperature shift converter 40, the hydrogen-rich reformate gas passes through the hot side of a HEX350 heat exchanger 42 and then to a tee junction 44 where a portion of the reformate flows to mix with the supply of natural gas and the remainder flows to the anodes 8 to fuel the chemical reactions in the anodes. The resultant gas then leaves the anodes 8 along anode exhaust line 46 to enter a HEX911 heat exchanger 48, where it picks up heat and then flows to the burner 36. The process exhaust then flows out of the reformer 34 and back through the HEX911 heat exchanger 48 and through a HEX910 heat exchanger 50 prior to flowing into a cathode exhaust line 52 of the waste heat recovery loop 4. There, it is mixed with heated air in a manner to be described, with the mixture flowing through a HEX920 heat exchanger 54 and then to ambient atmosphere via the exhaust conduit 56.

Turning now to the oxidant for the cathodes 6, a compressor 58 provides compressed ambient air to the cathodes 6 for use of the oxygen therein for the chemical reactions. The waste gases then exit the cathodes 6 and pass to the cathode exhaust line 52 where they are mixed with the exhaust gases from the burner 36 as described above. The flow of air is shown by the double dash-dot lines.

A portion of the compressed air from the compressor 58 is passed through the HEX910 heat exchanger 50 to be heated and then passes to the burner 36 to be mixed with the gas from the anodes 8 for combustion within the burner.

Referring now to the waste heat recovery loop 4, there is a water loop as shown by the single solid lines and a glycol loop as shown by the double long and two short dashed lines. A description will first be made of the water lines within the waste heat recovery loop 4.

A supply of water stored in a water treatment system tank 60 is pumped by pumps PMP450 62 and PMP451 64 to the cold side of a HEX435 heat exchanger 66 where it picks up heat and is then mixed with a supply of hot water from the TMS accumulator 30 prior to passing to a PMP400 pump 68. The stream of water exiting the PMP400 pump 68 passes through first junction 70, second junction 72, and then to a high grade heat exchanger 74 for the transfer of heat in a manner to be described more fully hereinafter. The portion of water bypassed at the first junction 70 passes to the cold side of the HEX350 heat exchanger 42, then to the cold side of the HEX340 38 heat exchanger, and then to the low temperature shift converter 40 where it is converted to steam which then passes to the TMS accumulator 30. The portion of water bypassing the high grade heat exchanger 74 at the second junction 72 flows to the hot side of a HEX400 heat exchanger 76. After giving up some heat and exiting HEX400 76, a portion of the flow splits at a third junction 78, while a majority of the flow serves as one input to a TCV480 thermal control valve 80. One portion of the flow at the third junction 78 passes through the hot side of a HEX431 heat exchanger 82 and splits at a fourth junction 84. One portion of junction 84 flows to the water treatment system tank 60, while the other portion of junction 84 passes through a DMN440 demineralizer 86 prior to being dumped back into the flow exiting PMP451 64.

After passing through the high grade heat exchanger 74, the water passes through a fifth junction 88. One leg of the fifth junction 88 diverts the flow to the second input of TCV480 thermal control valve 80; the other leg serves as an input to a TCV400 thermal control valve 90. The second input to the TCV400 thermal control valve 90 is the output of the TCV480 thermal control valve 80. The output of the TCV400 thermal control valve 90 passes along a coolant inlet conduit 92 to the cooler plates 12 where it is converted to steam which flows to the TMS accumulator 30.

Also included as part of the waste heat recovery loop 4 is the glycol loop 94 shown in double long and two short dashed lines. Circulation of the glycol within its loop is caused by the glycol pump 96 which discharges to tee 98 where it flows in two directions. One portion of the flow passes through the cold side of the HEX920 heat exchanger 54 and the other portion passes through the cold side of the HEX431 heat exchanger 82. The flow through each heat exchanger rejoins at a sixth junction 100 then passes through the hot side of the HEX400 heat exchanger 76 to pick up additional heat prior to entering a low grade heat exchanger 102 where the low grade heat is transferred from the glycol loop 94 to a customer service port. The glycol then passes through a fan cooled radiator 104 for the purpose of cooling the glycol and then back to the glycol pump 96.

The cell stack assembly 2 provides power to a facility electrical load 106. The facility electrical load 106 may be for a facility or an industrial process, for example. Although only one cell stack assembly 2 is shown in the illustrated example, a plurality of cell stack assemblies may utilized within the context of the present disclosure, depending on the particular electrical and thermal demands of the facility or process. In the disclosed embodiment, the fuel cell power plant 500 is also connected to the electric grid 108, known as operation in grid connect mode. Thus, the facility electrical load 106 may be met by combining the electrical power output of the fuel cell power plant 500 with the electrical power imported from the electric grid 108. A protective relay 110 may be installed to prevent power export from the fuel cell power plant 500 back to the electrical grid 108.

Some fuel cell power plants are cooled by circulating a liquid coolant, such as water, in serpentine fashion through and between the individual fuel cell plates. As the coolant absorbs sensible heat from the electrochemical reaction, its temperature increases. In other types of fuel cell power plants, such as the disclosed phosphoric acid power plant, the circulating coolant water is heated sufficiently to create a liquid/steam mixture. The mixture passes through a separator, where the steam is directed to a fuel reformer apparatus, and the remaining hot water passes through a heat exchanger or the like to be cooled before returning to the fuel cell power plant coolant inlet.

Waste heat generated by the cell stack assembly 2 may provide thermal power to a facility thermal load demand 112 by utilizing the high grade waste heat carried by the stack coolant fluid. The term high grade waste heat refers to fluid temperatures in excess of approximately 200° F. The stack coolant fluid enters the high grade heat exchanger 74 at a high temperature and gives up a portion of its thermal energy to the working fluid. In the disclosed example, the temperature of the coolant fluid entering the high grade heat exchanger 74 is approximately 310-335° F. and the temperature of the coolant fluid exiting the high grade heat exchanger 74 is approximately 250° F. The facility thermal load demand 112 may be direct heating or indirect cooling. For example, the working fluid exiting the high grade heat exchanger 74 may be used directly for facility or process heating requirements, such as makeup water for a boiler. Alternatively, indirect cooling needs for a facility may be satisfied by utilizing the high grade heat to drive a high stage generator in a double effect absorption chiller, as will be explained below.

In another embodiment, the low grade heat exchanger 102 may be utilized to satisfy a low grade thermal load demand 114, such as space heating or domestic hot water. The term low grade waste heat refers to fluid temperatures below 200° F., typically in the range of 140° F. to 150° F. In the disclosed example, the secondary coolant fluid enters the low grade heat exchanger 102 at a warm temperature and gives up a portion of its thermal energy to the facility working fluid in the low grade thermal load demand 114. The temperature of the coolant fluid entering the low grade heat exchanger 102 may be approximately 175-200° F. in one example and the temperature of the working fluid for the facility low grade thermal load demand 114 may be approximately 60-150° F. The facility low grade thermal load demand 114 could be domestic hot water or direct heat loads such as a swimming pool. The working fluid may be a central heating loop at the facility or a direct load depending on the building system design.

Figure 2:
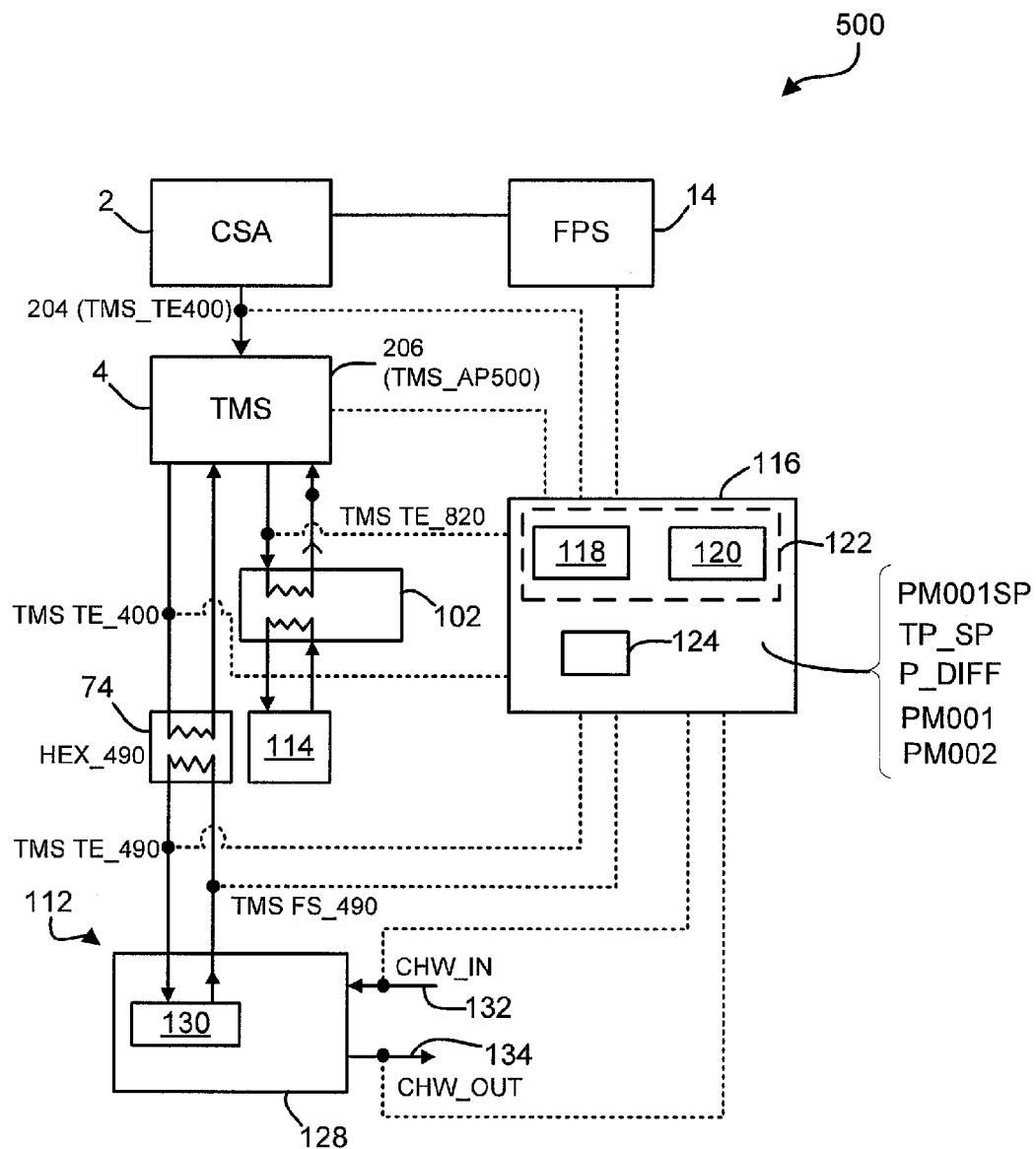
FIG. 2 is another schematic illustration of a fuel cell power plant system in accordance with an embodiment of the present disclosure.

Reliable and efficient operation of the fuel cell power plant 500 may be achieved through use of a supervisory controller 116. In one example, the controller 116 receives input from sensors and other controllers, and controls the operation of the cell stack assembly 2 by dispatching set points and the like to other controllers in the power plant 500. Referring now to FIGS. 1 and 2, the controller 116 includes a microprocessor 118 and its associated memory 120. The memory 120 of controller 116 stores operator or owner preselected, desired values for various operating parameters within the power plant 500 including, but not limited to, grid offset import values (PM001SP), set points (TP_SP) for the cell stack assembly 2, algorithms for calculating the difference in power values (P_DIFF), pressure limits, current limits, and any variety of other desired operating parameters or limits with the power plant 500. In the disclosed embodiment, controller 116 includes a microprocessor board 122 that houses microprocessor 118 and memory 120, an input/output (I/O) board 124, which contains an analog-to-digital converter 126 which receives temperature inputs and pressure inputs from various points in the system.

Among the specific sensors and transducers monitored by the controller 116 are Watts transducer PM001 which inputs into the microprocessor 118 a variable power value according to the electrical power imported from the electric grid 108, and various temperatures, pressures, and flow rates of the reactants. In addition, the controller 116 records customer selectable input power values for the fuel cell operation and customer selectable grid import power target values which will be controller by the fuel cell controller 116.

One important consideration in controlling the fuel cell power plant 500 is balancing the electrical load demand with the thermal load demand. As the cell stack assembly 2 operates at a given power level, it simultaneously supplies the electrical power output to the electrical load 106, for example the electrical demand from a facility or building, and the thermal power output to a thermal load 112, 114, such as an industrial process or a building's heating and cooling system. Conventional fuel cell power plants are controlled responsive to the electrical power demand, the electrical power being generated by the fuel cell stack, or both. As a corollary, any conversion of waste heat useful for thermal power has typically been offered to customers as an add-on feature of power plant ownership. In other words, the electrical power generation of the fuel cell power plant took precedence, and the thermal power generation was an uncontrolled byproduct. The scenario in which the thermal power generation has no bearing on the operation and control of the electrical power generation is referred to as the thermal power being "decoupled" from the control of the electrical power generation. In conventional market strategies, thermal power obtained 'for free' was better than none at all.

However, the volatility of utility costs has re-shaped conventional market strategies. In some market segments, usually dependant upon geographical location, the cost of facility heating and cooling services may warrant alternate methods for providing those services. For example, to provide heating and cooling to a building or facility, a fuel cell power plant may be coupled to an absorption chiller. The de-tuned thermal power supplied by a fuel cell power plant typically provides some, but not all, of the high grade heat for the absorption chiller. Expressed another way, the facility may periodically or continually demand more thermal power than the fuel cell power plant can provide. Electric heaters, gas-fired furnaces, and the like may supply the balance of the thermal demand.

In one example, a phosphoric acid fuel cell power plant rated for 200 kW may be connected to the electrical grid (grid-connect mode) and operated with an electrical power set point of 150 kW. Alternately, the power plant may be connected to a direct electrical load (grid-independent mode) that is 150 kW. At the beginning of the power plant's life cycle, the electrical power output is 150 kW and the thermal power output is approximately 170 kW. As the power plant ages and its electrical efficiency decreases, the electrical power set point remains at 150 kW however, the available thermal power increases to approximately 200 kW, due to the heat created by running inefficiently. As can be appreciated from the example, when the operation of the fuel cell power plant is in grid-connect or grid-independent mode, the thermal power output varies.

The inventors have noted that the additional cost of supplying the balance of the thermal load demand may be quite substantial. In fact, the inventors have discovered that in some geographic locations it is economically feasible to provide all the thermal power demand with the fuel cell power plant, while decreasing the efficiency of the electrical power generation. Accordingly, the inventors have devised a system and method to operate a fuel cell power plant in a thermal priority mode, as opposed to an electrical load-following mode.

In one example, the facility thermal load demand 112 drives a double effect lithium bromide (LiBr) absorption/ chiller 128, as shown in FIG. 2. A high stage generator 130 of the absorption/chiller 128 is coupled to the high grade heat exchanger 74 of the waste heat recovery loop 4 to provide either chilled water for building cooling, or heated water for building heating. Temperature sensor TMS_TE490 and flow sensor TMS_FS490 are utilized to calculate the thermal power being supplied to the absorption/chiller 128. The absorption/chiller 128 further includes a chilled water inlet conduit 132 wherein warm water returning from the building air conditioning system enters the absorption/ chiller 128 at approximately 12° C. (54° F.). The water is chilled to approximately 6.7° C. (44° F.) and exits via a chilled water exit conduit 134. Temperature sensors CHW_IN and CHW_OUT are located on the chilled water inlet conduit 132 and the chilled water exit conduit 134, respectively.

Figure 3:
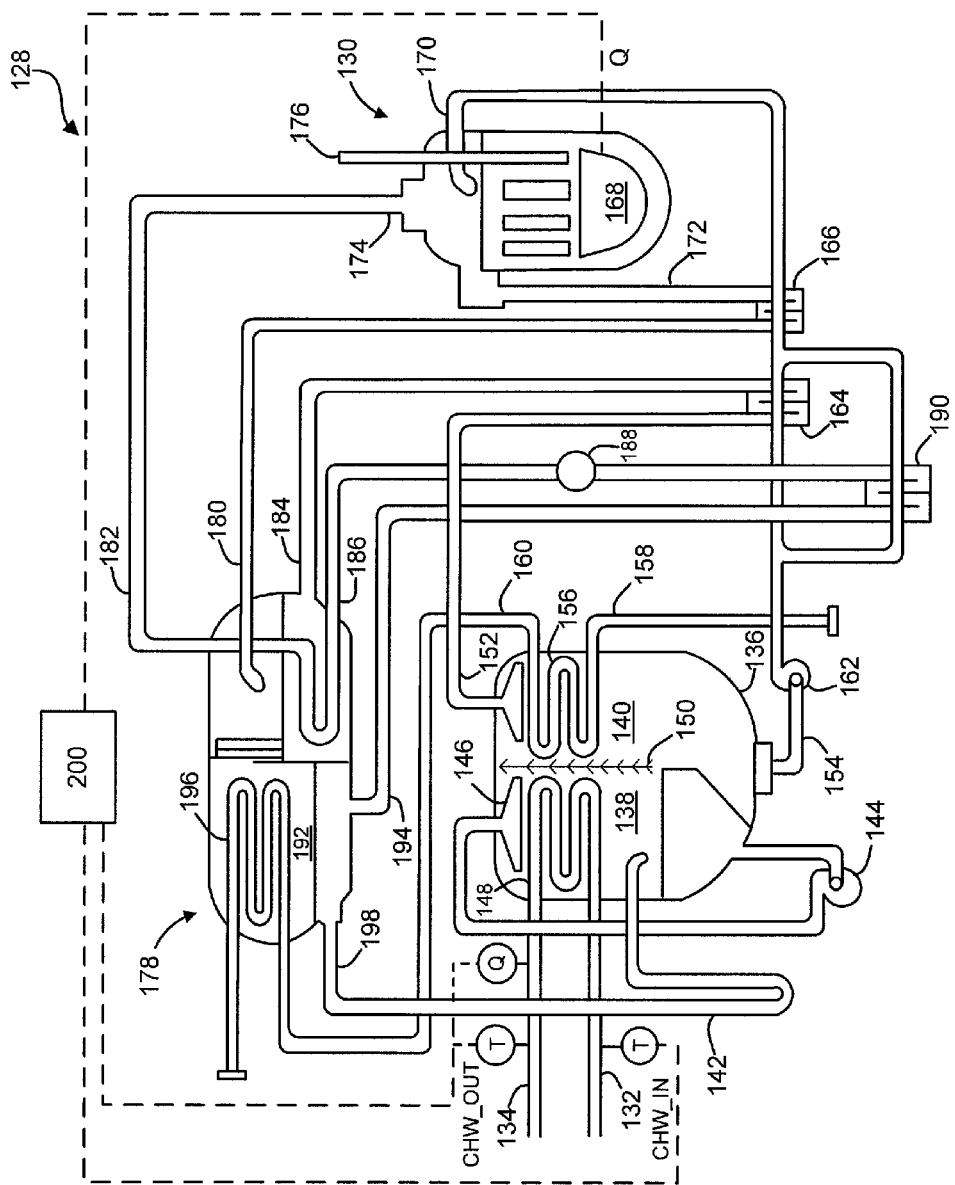
FIG. 3 is a schematic illustration of a double effect absorption chiller in accordance with one embodiment of the invention.

Turning to FIG. 3, the absorption/chiller 128 is shown in detail. A vacuum vessel 136 houses an evaporator section 138 and an absorber section 140. In the evaporator section 138, a liquid refrigerant, typically water, is heated to the point of vaporization, and the vapor passes over to the absorber section 140. The liquid refrigerant enters the lower portion of the evaporator section 138 through condensed refrigerant solution pipe 142 where it collects at the bottom of the vacuum vessel 136. A refrigerant pump 144 pumps the liquid to a sprinkler 146 at the top of the evaporator section 138. The liquid refrigerant exits the sprinkler 146 and the droplets contact a heat exchanger tube 148. In the disclosed example, the pressure within the vacuum vessel 132 is approximately 0.83 kilopascal (absolute) (0.12 pounds per square inch). At this pressure, the liquid refrigerant vaporizes at approximately 5° C. (41° F.). The temperature (CHW_IN) at the chilled water inlet 132 is approximately 12° C. (54° F.), sufficient raise the temperature of the liquid refrigerant to vaporization. The heat exchange correspondingly lowers the temperature (CHW_OUT) at the chilled water exit 134 to approximately 7° C. (45° F.), which is sufficient to satisfy the air conditioning requirements of the building.

The vaporized refrigerant passes through barrier 150, which may be a screen, to the absorber section 140 of the vacuum vessel 136. The absorber section 140 includes a concentrated absorbent inlet pipe 152 and a diluted absorbent outlet 154, and houses an absorbent such as a lithium bromide (LiBr) solution, for example. Although the present system employs water as a refrigerant and lithium bromide as an absorbent, any suitable combination can be utilized in the practice of the disclosure. Lithium bromide has a high affinity for water and will absorb water in relatively large amounts under the machine's normal operating conditions. The absorber section 140 further includes a cooling water heat exchanger tube 156 having an inlet 158 and an outlet 160. In the disclosed example, the concentrated LiBr solution absorbs the water vapor from the evaporator section 138, thereby diluting the LiBr solution. As the LiBr solution becomes saturated with water, it settles to the bottom of the vacuum vessel 136. From there, a first absorbent pump 162 pumps it through a low temperature heat exchanger 164 and a high temperature heat exchanger 166, to be discussed in detail below, and then to the high stage generator 130.

The high stage generator 130 is coupled to a heat source 168 that operates to vaporize the refrigerant from the absorbent. In the disclosed example, the heat source 168 is the working fluid (e.g., water) exiting the high grade heat exchanger 74. Although the disclosed absorption/chiller system 128 is a double effect type absorption chiller, a single effect or other multiple effect type absorption chiller could be used without departing from the scope of the disclosure.

The high temperature generator 130 includes a diluted absorbent inlet 170, an intermediate absorbent outlet 172, a refrigerant vapor exit 174, and an exhaust gas outlet 176. The diluted absorbent is received through diluted absorbent inlet 170 and heated to its saturation temperature by exposure to the heat source 168, whereupon refrigerant vapor is liberated and leaves the high temperature generator 130 at the refrigerant vapor exit 174. The resulting absorbent solution is more concentrated and exits the high temperature generator 130 at the intermediate absorbent outlet 172. Excess heat from the high temperature generator 130 is rejected to atmosphere at the exhaust gas outlet 176.

The absorption/chiller system 128 further includes a low temperature generator 178 having an intermediate absorbent solution inlet 180, a refrigerant vapor inlet 182, a concentrated absorbent solution outlet 184, and a refrigerant vapor outlet 186. The intermediate absorbent solution exiting from the intermediate absorbent solution inlet 180 passes through the high temperature heat exchanger 166 where the temperature is decreased prior to entering the low temperature generator 178 at the intermediate adsorbent solution inlet 180. The intermediate absorbent solution is exposed in heat exchange relationship to the hot refrigerant vapor inlet 182. Additional refrigerant vapor is released from the intermediate absorbent solution due to the pressure difference temperature increase. The remaining absorbent solution, having given off most of its remaining refrigerant vapor, exits at the concentrated absorbent solution outlet 184 and is pumped through the low temperature heat exchanger 164 by a second absorbent pump 188. Thus cooled, the concentrated absorbent solution is re-admitted to the absorber section 140 of the vacuum vessel 136 where it is able to re-absorb refrigerant vapor, and the cycle begins over.

Refrigerant vapor exiting from refrigerant vapor exit 174 enters the low temperature generator 178 at the refrigerant vapor inlet 182. The refrigerant vapor is cooled by the heat exchange with the intermediate absorbent solution and exits through the refrigerant vapor outlet 186. From there, the mixture of vapor and liquid passes through a refrigerant drain heat reclaimer 190 where it is fully condensed and returned to the bottom of a condenser 192 at a condensed refrigerant inlet 194. The condenser 192 includes a second cooling water heat exchanger tube 196, which in some embodiments may be connected to the outlet 160 of the cooling water heat exchanger tube 156 of the absorber section 140. Cooling water circulating through the second cooling water heat exchanger tube 196 serves to condense the refrigerant vapor released in the low temperature generator 178 and subsequently passed to the condenser 192. The condensed liquid refrigerant is admixed with the liquid from the condensed refrigerant inlet 194 and leaves the condenser 192 at a condensed refrigerant outlet 198. The condensed refrigerant then flows to the condensed refrigerant solution pipe 142 in the vacuum vessel 136, and the cycle begins over.

An absorption/chiller master controller, or second controller 200, is adapted to monitor system parameters and regulate the temperature and flow at the chilled water exit conduit 134 to meet the thermal load demand. The absorption/chiller second controller 200 monitors (among other things) the temperature at the chilled water inlet conduit 132 (CHW_IN), the temperature at the chilled water exit 134 (CHW_OUT), the chilled water flow rate, the temperature and thermal power (RT) of the heat source 168, as well as various internal system pressures, temperature, and coolant flows.

In an exemplary embodiment disclosed herein, a thermal priority mode for operating the fuel cell power plant may be realized by establishing a set point in the controller 116 for the thermal power output and adjusting a fuel cell power plant parameter responsive to the thermal load demand. In this manner, the electrical power output of the cell stack assembly 2 may be de-tuned from the thermal power output.

In one embodiment, the thermal power set point may be 170 kW and the fuel cell power plant parameter may be the stack coolant exit temperature 202, for example sensor TMS_TE400. Temperature sensor CHW_IN inputs into the microprocessor 118 a variable resistor value according to the water temperature entering the absorption/chiller 128; temperature sensor CHW_OUT inputs into the microprocessor 118 a variable resistor value according to the water temperature exiting the absorption/chiller 128, and the controller 116 may calculate the thermal power demand and raise or lower the stack coolant exit temperature 202 to meet the particular demand. An increase in stack outlet temperature provides more heat to the high grade heat exchanger 74 and the low grade heat exchanger 102, and thus more thermal power to the facility thermal load demand 112 and the low grade thermal load demand 114, respectively.

Alternately, the temperature or pressure of the TMS accumulator 30 may be adjusted responsive to the thermal power demand. In one example, a TMS pressure input 204 to the controller 116, such as TMS_AP500, is monitored and adjusted. A higher TMS pressure set point results in more superheating of the coolant fluid therein. As the temperature of the coolant fluid increases, more thermal power becomes available to meet customer needs. The TMS pressure input 204 may be adjusted to the set point by supplying back pressure to system control valves, for example.

Another specific manner in which the stack outlet temperature may be changed is to alter the fuel cell reactant utilization. Reactant utilization is a measure of fuel cell efficiency, and refers to the volume percentage of reactant that is consumed in the electrochemical reaction. Thus, in another embodiment, the thermal power set point may be 170 kW and the adjusted fuel cell power plant parameter may be the reactant utilization. In one example, the baseline hydrogen utilization is set to 80%, which means that 80% of the hydrogen flowing to the anodes 8 is consumed in the electrochemical reaction. To meet an increase in the thermal power demand, the controller 116 may decrease the hydrogen utilization to 70%, which will increase the flow of hydrogen by approximately 12%. The lower utilization also decreases the electrical efficiency, which by one measure is the ratio of electrical power to fuel consumption. Since the heating value of the hydrogen results in either electricity or heat, and the electrical efficiency decreased, the additional fuel flow results in increased heat, or increased thermal power output.

In another example, the air (e.g., oxidant) utilization may be increased to similar effect. In a typical fuel cell power plant wherein air is supplied at a utilization of approximately 60%, further increasing the utilization (or decreasing the supply of oxygen to the electrochemical reaction) decreases the efficiency of electric power production at the reaction site. Thus, the electrical efficiency is decreased and leads to addition thermal power generation.

In another embodiment, there is no set point per se for thermal power, instead there is a setting instructing the controller to continuously maximize the thermal power output of the power plant. In this manner, the power plant will provide the highest possible thermal power output within the physical limits of safe and reliable operation of the power plant. The thermal power may be adjusted by any of the previously disclosed methods.

Figure 4:
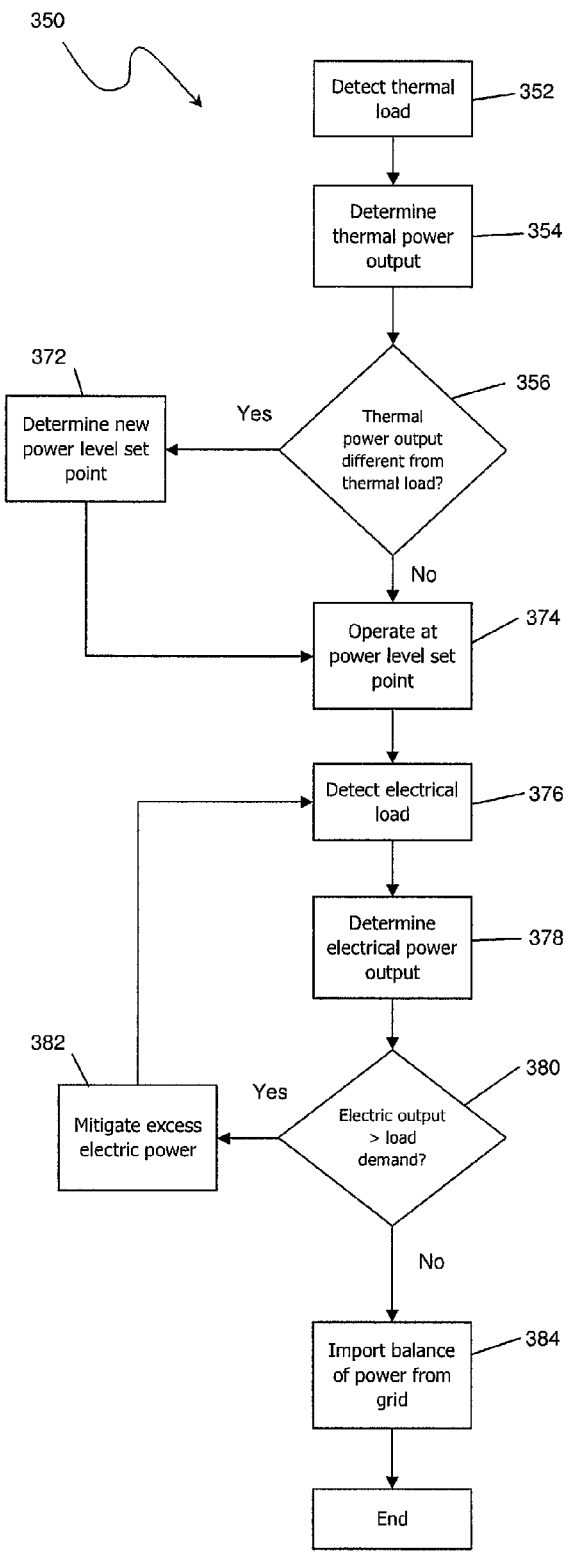
FIG. 4 is a block diagram of a method for operating a fuel cell power plant in a thermal load following mode according to an embodiment of the present disclosure.

Referring to FIG. 4, a method 350 of operating a fuel cell power plant in thermal priority mode is shown. The method 350 comprises a step 352 of detecting the thermal load of the process or facility, and storing the value in the memory 120 of the controller 116, for example. Likewise, at a step 354, the thermal power output of the fuel cell power plant 500 is determined. Typically, the thermal power output is a measure of kilowatts of heat or tons of refrigeration (RT).

At a step 356, a comparison is made between the thermal power output of the fuel cell power plant 500 and the thermal load demand to establish a thermal power difference. In the disclosed embodiment, the comparison is performed by an algorithm programmed in the controller 116 using sensing inputs such as pressure, temperature, or flow rate. If the thermal power output is substantially different from the thermal load demand, for example more than five percent (greater than or less than), a new thermal power set point (TP_SP) for the power plant 500 is determined responsive to the thermal power difference, as shown at a step 372. In the disclosed embodiment, the controller 116 is programmed to calculate the new set point. The new set point may also be determined from lookup tables stored in memory 120, for example, or estimated by engineers, or simply set to a maximum value for the particular power plant. Once the new set point is determined, the controller 116 commands the fuel cell power plant 500 at a step 374 to ramp up or ramp down to the new set point according to a predetermined schedule, or ramp rate. In one example, the ramp rate is thirty seconds.

If, in the comparison performed at step 356, the thermal power output 46 is substantially the same as the thermal load 48, e.g. steady state, the controller 116 takes no action and continues to operate at the set point established at the previous iteration, shown at step 374.

At a step 376, the electrical power demand (or load) is detected by conventional means, such as Watts transducer, PM001. At a step 378, the electrical power output generated by the fuel cell power plant 500 is determined by conventional means. At a step 380, the electrical load and the electrical power output are compared using an algorithm stored in the memory 120 of the controller 116, for example. If the electrical power output is greater than the electrical load by a target value that is specified by the customer, a mitigation step may be undertaken, as shown at a step 382. In one example, the mitigation step 382 involves absorbing the excess electrical power to a load bank, such as a series of heaters. In another example, the mitigation step 382 supplies electrical power to a water heater for the process or facility. In yet another example of a mitigation step 382, the controller 116 utilizes the grid export protection software used for the electrical load following (ELF) mode. Using this mitigation step 382, if the electrical power output generated by the cell stack assembly 2 exceeds the electrical load, an override is activated wherein the power level of the fuel cell power plant 500 is temporarily reduced, for example.

In most thermal load following modes, the electrical power output generated by the fuel cell power plant 500 will be less than the electrical load. At a step 384, the balance of power required for the electrical load is imported from the electric grid 108. In the example shown, the method 350 starts a new iteration at step 352.

One advantage of the thermal load following mode is that method 350 allows a fuel cell power plant operator to tailor the value proposition of the system 10 according to energy market pricing. In a volatile energy market where the cost of supplying the balance of the thermal power is more than the cost of running the cell stack in an inefficient manner, financial factors may dictate the temporary, or permanent, utilization of all the waste heat generated by the fuel cell power plant 500. This provides an advantage over the electrical load following mode, wherein the fuel cell power plant 500 frequently changes power level to accommodate fluctuations in electrical demand without regard to the thermal demand.

In other market conditions, a fuel cell power plant operator may simply value the thermal power more than the electrical power.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

We claim:

1. A fuel cell power plant comprising:
   a cell stack assembly for generating an electrical power output, the cell stack assembly comprising an anode and a cathode, the anode is configured to receive a fuel, the cathode is configured to receive an oxidizer, the cell stack assembly is configured to generate the electrical power output by electrochemically reacting the anode fuel and the cathode oxidizer in the presence of a catalyst;
   a waste heat recovery loop thermally coupled to the cell stack assembly for managing waste heat of the cell stack assembly and for supplying thermal power to a thermal load demand, the waste heat recovery loop comprising a coolant inlet conduit and a coolant outlet conduit and configured to remove waste heat generated from the electrochemical reaction and comprising a heat exchanger in heat exchange relationship with the coolant outlet conduit and the thermal load demand; and
   a controller operatively associated with the cell stack assembly and the waste heat recovery loop, the controller controlling the operation of the cell stack assembly by adjusting a fuel cell power plant parameter responsive to the thermal load demand, wherein the electrical power output of the cell stack assembly is decoupled from the thermal power being supplied to the thermal load demand.

2. The fuel cell power plant of claim 1, wherein the thermal load demand comprises a facility load demand and the heat exchanger in the waste heat recovery loop comprises a high grade heat exchanger.

3. The fuel cell power plant of claim 2, wherein the thermal load demand comprises a demand for direct heat.

4. The fuel cell power plant of claim 2, wherein the thermal load demand comprises a demand for indirect cooling.

5. The fuel cell power plant of claim 4, wherein the waste heat recovery loop is thermally coupled to a double effect absorption chiller.

6. The fuel cell power plant of claim 1, wherein the adjustment of the fuel cell power plant fuel cell power plant parameter equalizes the thermal power with the thermal load demand.

7. The fuel cell power plant of claim 1, wherein the adjustment of the fuel cell power plant fuel cell power plant parameter maximizes the thermal power output.

8. The fuel cell power plant of claim 1, wherein the fuel cell power plant fuel cell power plant parameter is cell stack coolant exit temperature.

9. The fuel cell power plant of claim 1, wherein the fuel cell power plant parameter is reactant utilization.

10. The fuel cell power plant of claim 9, wherein the fuel utilization is decreased.

11. The fuel cell power plant of claim 9, wherein the oxidant utilization is increased.

12. The fuel cell power plant of claim 1, further comprising a fuel processing system, and the fuel cell power plant parameter is a temperature for a thermal management system accumulator.

13. A fuel cell power plant comprising:
a cell stack assembly for generating an electrical power output, the cell stack assembly comprising an anode, and a cathode, the anode is configured to receive a fuel, the cathode is configured to receive an oxidizer, the cell stack assembly is configured to generate the electrical power output by electrochemically reacting the anode fuel and the cathode oxidizer in the presence of a catalyst;
a waste heat recovery loop thermally coupled to the cell stack assembly for managing waste heat of the cell stack assembly and for supplying thermal power to a thermal load demand, the waste heat recovery loop comprising a coolant inlet conduit and a coolant outlet conduit and configured to remove waste heat generated from the electrochemical reaction and comprising a heat exchanger in heat exchange relationship with the coolant outlet conduit and the thermal load demand; and
a controller operatively associated with the cell stack assembly and the waste heat recovery loop, the controller controlling the operation of the cell stack assembly by adjusting reactant utilization responsive to the thermal load demand.

14. The fuel cell power plant of claim 13, wherein the fuel utilization is decreased.

15. The fuel cell power plant of claim 13, wherein the oxidant utilization is increased.

16. The fuel cell power plant of claim 13, wherein the electrical power output of the cell stack assembly is decoupled from the thermal power being supplied to the thermal load demand.

17. The fuel cell power plant of claim 13, wherein adjusting the reactant utilization equalizes the thermal power with the thermal load demand.

18. The fuel cell power plant of claim 13, wherein adjusting the reactant utilization maximizes the thermal power output.

19. The fuel cell power plant of claim 13, comprising a fuel processing system, and wherein the controller controls operation of the cell stack assembly to adjust a temperature for a thermal management system accumulator of the fuel processing system.

* * * * *